PRINTER EMPLOYING PARALLEL PRINTER BARS, AND IMPROVED MOUNTING MEANS THEREFOR

Filed May 13, 1966 2 Sheets-Sheet 1

INVENTOR.
EVERETT J. WEST
BY John V. Regan
Attorney

Sept. 17, 1968 E. J. WEST 3,401,781

PRINTER EMPLOYING PARALLEL PRINTER BARS, AND IMPROVED MOUNTING MEANS THEREFOR

Filed May 13, 1966 2 Sheets-Sheet 2

INVENTOR.

EVERETT J. WEST

BY John V. Regan

Attorney

United States Patent Office 3,401,781
Patented Sept. 17, 1968

3,401,781
PRINTER EMPLOYING PARALLEL PRINTER BARS, AND IMPROVED MOUNTING MEANS THEREFOR

Everett J. West, Collingswood, N.J., assignor to Radio Corporation of America, a corporation of Delaware Filed May 13, 1966, Ser. No. 550,055
10 Claims. (Cl. 197—1)

ABSTRACT OF THE DISCLOSURE

A support structure for the print bars in a bar printer using selectively actuable arms for moving the print bars. Each of the actuating arms are arranged to induce a movement of a corresponding print bar in a direction which is substantially normal to the direction of movement induced by an associated arm to an adjacent print bar.

This invention relates to bar printers and, in particular, to an improved arrangement for mounting printer bar structures.

In a matrix-type printer, each different character is made up of a distinctive group of small "picture" elements printed on a recording medium at the intersections of selected rows and columns of an imaginary print matrix. The rows of picture elements of a character, for example, may be printed column-by-column by the pressure between a plurality of parallel, independently movable printer bars and a scanning anvil. In general, the larger the number of printer bars employed, the more acceptable is the character print font. This is so since the number of picture elements in the print matrix varies directly with the number of printer bars. The larger that the number of available picture elements is, the more flexible is the choice of picture elements for printing any given character. However, for a given character height, the thickness of the individual printer bars varies inversely with the number of printer bars employed.

For high quality printing, and for high speed printing with moderate power requirements, the printer bars should be of very lightweight construction. In order to prevent wobbling and twisting of the lightweight printer bar structures, and also to avoid large gaps between adjacently printed picture elements, it is necessary or desirable to stack the printer bar structures in a tight array. In fact, adjacent printer bar structures usually will be in contact with one another.

The problem which is introduced by such tight stacking is that an actuated printer bar may drag an inactive, adjacent printer bar into printing position. Even if no printing by the adjacent bar takes place, the movement of this bar away from its normal rest position may change significantly the distance which the bar must travel when it is selected for printing. As is known, impact or striking force and, hence, density of printing, is a function of the distance a printer bar travels when actuated.

It is an object of this invention to provide an improved printer bar assembly which does not suffer the fore-going disadvantages.

It is another object of this invention to provide a plurality of printer bar structures which are stacked in a tight array, but in which there is no movement of one printer bar structure by an adjacent one.

It is still another object of this invention to provide improved means for mounting printer bar structures to prevent frictional coupling, in a printing direction, between adjacent structures.

In apparatus embodying the invention, a plurality of printer members, e.g., printer bar structures, are stacked in side-by-side relation, and each has a printing edge. At least two arms support a printer member. The center lines of all supporting arms for a member are parallel to one another, inclined with respect to the printing edge thereof, and have the same effective length. The center lines of the arms of adjacent printer members are substantially normal to one another.

In the accompanying drawing, like reference characters denote like components, and:

Figure 1:
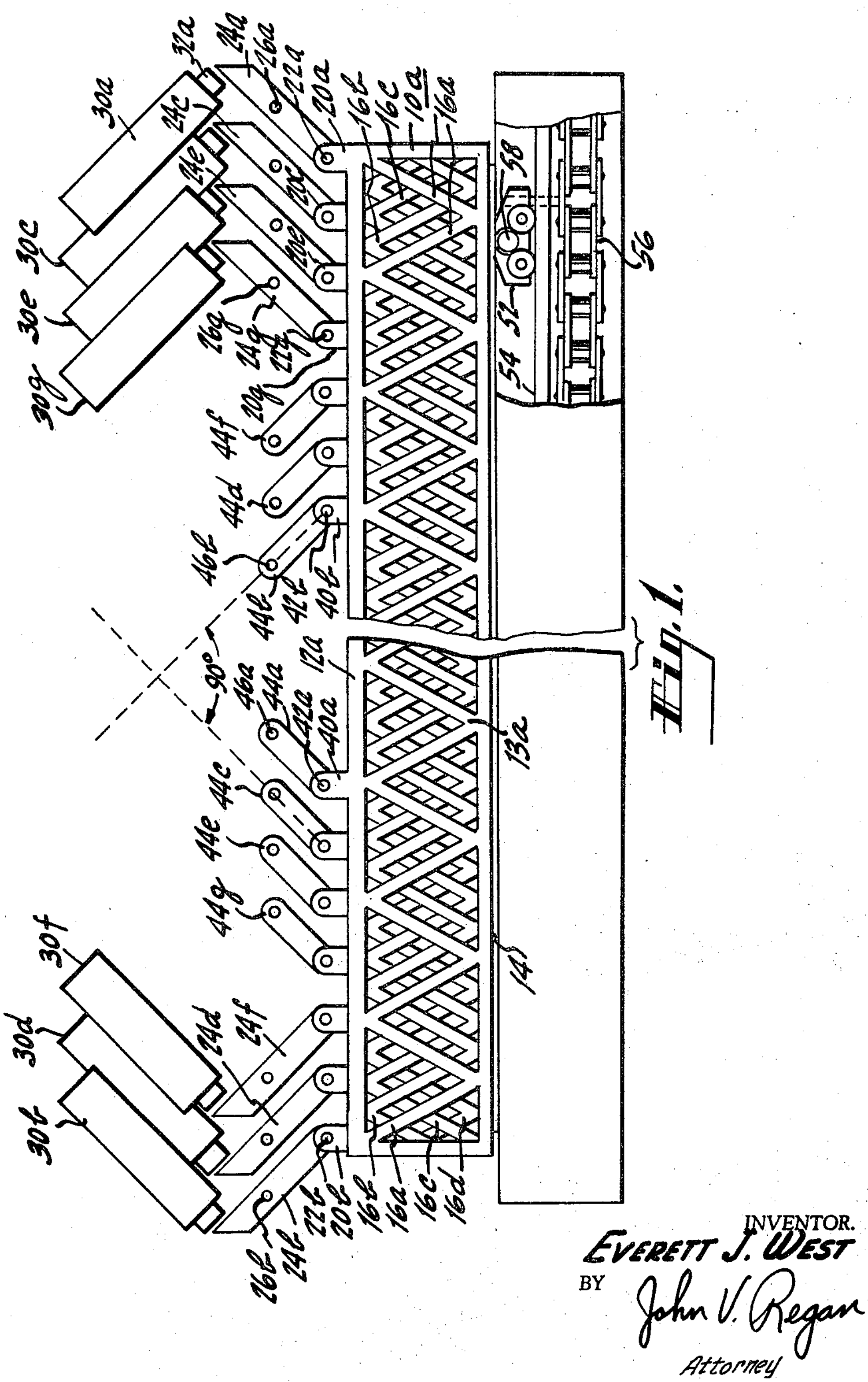
FIGURE 1 is a fragmentary view in front elevation of a printer bar system embodying the invention.

In the system of FIGURE 1, seven printer members or structures are stacked in a tight array, one behind the other, with the several structures parallel to each other. Because these structures are identical except for the locations of supporting arms connected thereto, only the forwardmost printer structure will be described in detail. In order to distinguish between the components of the several structures, the component portions of the forwardmost structure are given reference numerals followed by the alphabetic character *a*. Similar components of the second structure have similar reference numerals followed by the alphabetic character *b*, etc. The reference characters for the rearmost, or last, structure have reference numerals followed by the alphabetic character *g*.

The forwardmost printer structure 10*a* comprises first and second elongated, horizontal members 12*a* and 13*a* which extend across the width of the sheaf 14 of documents, i.e., paper stock, and carbon papers. Horizontal member 13*a* is a printer bar. A plurality of supporting struts 16*a* are arranged in a regular or repetitive zigzag pattern along the lengths of the elongated members 12*a*, 13*a* and are joined at their opposite ends to the bottom of top member 12*a* and the top of bottom member 13*a*. These struts 16*a* maintain the elongated members 12*a*, 13*a* in spaced, parallel relation, whereby the entire structure 10*a* may be made very thin and light in weight, while still maintaining structural stability. This is very desirable in the interests of providing a low inertia structure for high speed printing.

The zigzag patterns of struts of adjacent printer structures are off-set, or "out-of-phase" with each other in such a manner that the struts of any one structure are transverse to adjacent struts of the next adjacent structure. Thus, there is only a small area of frictional contact between each pair of adjacent struts of adjacent structures. These struts, if desired, can be made slightly thicker than the elongated members associated therewith. In this manner, when the several printer structures are packed in a tight array, the small areas of contact between struts of adjacent printer structures represent the only areas of frictional contact between the adjacent structures.

Forwardmost printer structure 10*a* has a vertically projecting tab 20*a* at the upper right corner thereof. A pivot pin 22*a* extends through an aperture in tab 20*a* and is affixed at its other end to a solenoid arm 24*a*, whereby the structure 10*a* is pivotally pinned to the solenoid arm. Solenoid arm 24*a* is mounted on a rod 26*a*, the axis of which is fixed in space. A solenoid 30*a* has its core 32*a* positioned close to the upper end of the solenoid arm 24*a*, and slightly spaced therefrom.

Forwardmost printer structure 10*a* has one or more other vertically projecting tabs spaced along the length of the upper member 12*a*. One of these tabs is shown in FIGURE 1 and may be identified by the reference character 40*a*. A pivot pin 42*a* projects through an aperture in tab 40*a* and is affixed at its other end to a supporting link arm 44*a*. Arm 44*a* is rotatable about a rod 46*a* whose axis is fixed in space.

In a similar manner, each of the other printer structures has at least two vertically projecting tabs, one of which is pivotally pinned to a rotatable solenoid arm, and the other of which is pivotally pinned to a supporting link arm. By way of example, the second printer bar structure has a vertically projecting tab 20*b* at the upper left end thereof. A pivot pin 22*b* projects through an aperture in this tab and is affixed to a supporting solenoid arm 24*b*. Arm 24*b* is rotatably mounted on a rod 26*b*. A second pivot pin 42*b*, affixed to a link arm 44*b*, projects through an aperture in tab 40*b*. Arm 44*b* is pivotally mounted on a rod 46*b*.

All of the supporting arms for any given printer bar structure are parallel to each other and inclined with respect to the elongated printing surface (the bottom edge) of the associated printer bar. Thus, for example, the center line of solenoid arm 24*a*, which extends through the axes of pivot pin 22*a* and rod 26*a*, is parallel to the center line of the link arm 44*a*, i.e., a line extending through the axes of pivot pin 42*a* and rod 46*a*. Further, the distance between the axes of rod 26*a* and pivot pin 22*a* is the same as the distance between the rod 46*a* and the pivot pin 42*a*. Therefore, although the solenoid arm 24*a* has an overall length which is greater than that of the link arm 44*a*, the effective lengths of those portions of the two arms 24*a*, 44*a* which supports the printer structure 10*a* are the same, whereby solenoid arm 24*a* and link arm 44*a* function as two opposite arms of a parallelogram linkage.

The aforementioned features as to the effective lengths of the solenoid arm and link arm, the distance between associated rods and pivot pins, etc., also hold true for all of the other printer bar structure assemblies. Thus, the axes of all of the pivot pins 22*a* . . . 22*g* may lie in a first, horizontal plane, and the axes of all of the rods 26*a* . . . 26*g* may lie in a second plane which is parallel to the first plane and spaced therefrom.

It will be noted in FIGURE 1 that the solenoid arms and associated link arms for some of the printer bar structures are inclined in a first direction relative to the associated printer bars, while the solenoid arms and associated link arms of other ones of the printer bar structures are inclined in a different direction relative to associated printer bars. In apparatus embodying the present invention, the center lines of the solenoid arms and associated link arms of alternate ones of the printer bar structures, e.g., 10*a*, 10*c*, 10*e* and 10*g*, are inclined at an angle close to 45° with respect to the printing edges of associated printer members. The center lines of solenoid arms and link arms for the remaining printer structures, e.g., structures 10*b*, 10*d* and 10*f*, are inclined at an angle close to 135° relative to the printer surfaces of associated structures. By this arrangement, the center lines of the solenoid arms and link arms of the odd numbered print structures are substantially normal to the center lines of the solenoid arms and link arms for the even numbered structures. The importance of this feature will become more apparent as the discussion proceeds.

The sheaf 14 of documents and carbon papers rests upon the top surface of a platen 50, a portion of which is broken away to show the anvil mechanism. The bottom edges, or printing surfaces of the printer bars overlie the documents on one side of a document printing zone. A channel or raceway is cut in the top surface of platen 50 on the other side of the document printing zone, facing the printing surfaces of the print bars. Located within platen 50 is a four-wheeled cart or carriage member 52 which is driven along a pair of tracks 54, at constant speed, from one end of the print zone to the other, by an endless link chain 56. Carried by the cart and driven by the cart wheels is an elongated anvil pin 58 which projects into the aforementioned channel and has its top edge approximately even with the top surface of platen 50.

Because of the lightweight construction of the printer bar structures, these structures may be free to float in contact with the surface of the top document when in the inactive state. No printing takes place at this time because the weight of the printer structures is insufficient to press the documents against the anvil pin 58 with sufficient force. During a printing operation, the solenoids 30*a* . . . 30*g* for selected ones of the printer bar structures are energized. When solenoid 30*a* is energized, for example, the upper end of solenoid arm 24*a* is attracted by the core 32*a* of solenoid, and solenoid arm 24*a* is rotated through a small angle, in a counterclockwise direction, about rod 26*a*. The rotation of arm 24*a* applies a driving force to the printer bar structure 10*a* through the pivot pin 22*a*. The printer bar structure 10*a* undergoes pantographic type motion when the solenoid 30*a* is energized, and the structure 10*a* pivots about the pins 22*a* and 42*a* as the solenoid arm 24*a* and link arm 44*a* rotate through the same angle about the rods 26*a* and 46*a*, respectively. Because of the parallelogram linkages, the printing surface of the print bar 13*a* always is horizontal and parallel to the document for every possible position of the print bar structure. The printer bar 13*a* presses the documents and carbons against the anvil pin 58 to effect the printing of a mark on the documents at a location immediately above the anvil pin 58. The operation of the other structures is similar, and need not be described.

Figure 3:
FIGURE 3 is a diagram illustrating the printing technique.

By way of example, the letter E is printed in the following manner (refer to FIGURE 3). As mentioned previously, the anvil pin 58 is driven at constant speed from one end of the printer bar structures to the other. This distance may be arbitrarily divided into a number of equal time zones, wherein a time zone is defined as the time it takes for the anvil pin 58 to move a predetermined distance. Seven time zones may be allotted for the printing of each character. Since there are seven printer bars, the print matrix may be considered to consist of seven rows and seven columns, each row corresponding to a different printer bar and each column corresponding to a different time zone.

All of the solenoids 30*a* . . . 30*g* are energized during a first time zone. Each of the printer bars then presses the documents against the anvil as the anvil pin 58 moves through the first zone. A column of seven marks is printed on the document to form the vertical stroke for the leading edge of the character E. At the end of the first time zone, solenoids 30*b*, 30*c*, 30*e* and 30*f* become de-energized. The remaining solenoids 30*a*, 30*d* and 30*g* remain energized during the second, third and fourth time zones, and solenoids 30*a* and 30*g* additionally remain energized during the fifth time zone, to print the horizontal strokes for the character E.

It will be recalled that there are areas of frictional contact between adjacent printer bar structures due to the tight stacking thereof. If all of the printer bar structures were suspended or supported for movement in the same direction, a printer bar structure, when activated by its associated solenoid, could drive the adjacent printer bar structure into printing position by virtue of the frictional contact therebetween. Undesirable printing by an inactive printer bar structure could result.

Even if no printing by the inactive printer bar resulted, the movement of the inactive printer bar structure from its normal rest position could have the effect of changing the distance which that printer bar would move to effect printing when that structure were next activated. As is known, the force with which a printer bar drives the documents against an anvil is a function of the distance which that printer bar moves during the print operation. Also, the density of printing is a function of the printing force. Accordingly, the frictional contact and resulting drag on an inactive print bar structure by an actuated printer bar structure could result in either undesirable printing or variable print density, both of which results are undesirable in a printer.

Also, the time at which a print bar presses the documents against the anvil is a function of the distance which the print bar must move. Hence, variation in starting position of a printer bar results in a variation in the time of printing, and can result in horizontal distortion in a printed character.

These results are avoided in apparatus embodying the invention by the previously described arrangement of the solenoid arms and link arms. In particular, these results are avoided by arranging the solenoid arms and link arms of adjacent ones of the printer bar structures to be approximately normal to one another. (Actually, the angle between links of adjacent structures might possibly depart several degrees from the normal and still be free of adverse frictional coupling. However, the 45° and 135° angles are optimum and assure freedom from the adverse frictional coupling.)

Figures 2, 4:
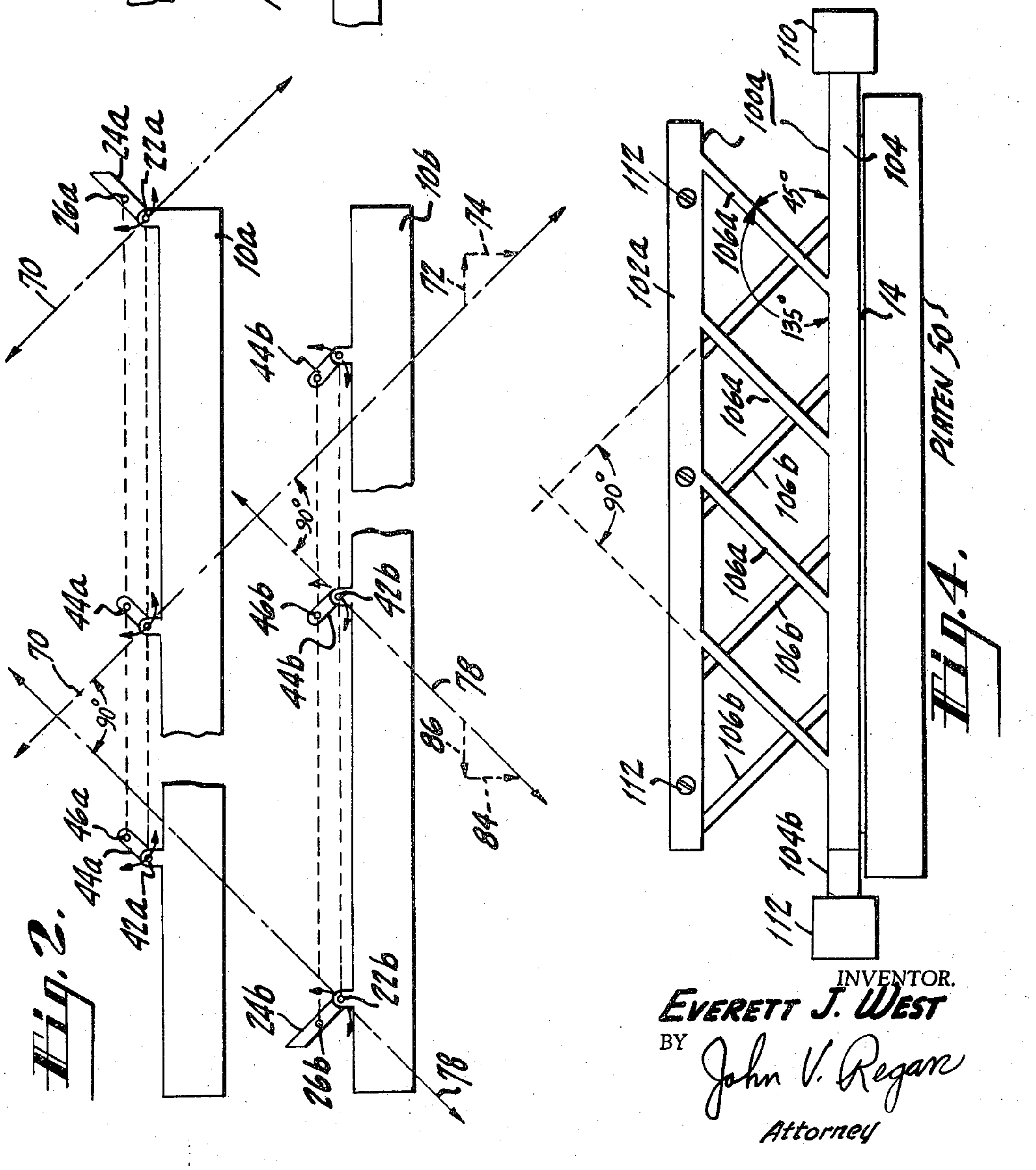
FIGURE 2 is a diagram useful in describing the principle of the invention.
FIGURE 4 is a partial view in front elevation of another printer bar system embodying the invention.

The details of this improved arrangement can best be seen by a consideration of FIGURE 2, wherein two adjacent printer bar structures are illustrated, one above the other, and wherein the printer bar structures are shown for convenience as solid members. Upper printer bar structure 10*a* has its solenoid arm 24*a* and link arm 44*a* inclined at an angle of approximately 45°, When the solenoid (not shown) for this structure is energized, the solenoid arm 24*a* and link arms 44*a* rotate in a counterclockwise direction about the pivot rods 26*a* and 46*a*, respectively. The axes of the connecting pins 22*a* and 42*a* may move along the small arcs indicated by the arrows. Actually, the printer bar structure and arms can move only a small amount because the printer bar surface is in contact with the top document when in the inactive position.

Because of the parallelogram linkage arrangement, all points on the printer bar structure move along arcs with differently located centers but of equal radii. Because these arcs subtend such small angles, it may be said that all points on a printer structure move approximately along straight lines which are parallel to lines 70. These lines 70 are tangent to the arcs of movement of the connecting pins, at the rest positions thereof, and are inclined at an angle of approximately 135° relative to the printing surface of the printer bar.

The path of movement of the points on the printer bar structure 10*a*, and also the force imparted to the printer bar structure have both a horizontal component and a vertical component, indicated by the dashed lines 72 and 74, respectively. The horizontal component 72 is directed to the right, and the vertical component 74 is directed downward. By way of example, the horizontal and vertical distances moved by a structure may each be about 0.005 inch.

The next adjacent printer bar structure 10*b* has its solenoid arm 24*b* and link arms 44*b* inclined at an angle of approximately 135° relative to the printing edge of that bar. When the solenoid (not shown) for that bar is energized, the solenoid arm 24*b* and link arms 44*b* rotate in a clockwise direction through a small angle about the pivot rods 26*b* and 46*b*, respectively. The paths of travel of the axes of the connecting pins 22*b* and 42*b* are indicated by the small arcs terminated in arrowheads. Again, because the printer bar is in contact with the document in the rest position, the arms are constrained to move only through a small angle. Also, because of the parallelogram linkage arrangement, all of the points on the printer bar structure 10*b* move approximately along lines which are parallel to the lines 78, for reasons discussed previously. These lines 78, as shown in FIGURE 2, are at right angles to the lines 70 defining the paths of movement of points on printer bar structure 10*a*.

The paths of movement of the points on printer bar structure 10*b*, and also the force imparted to this bar structure, have both a vertical component and a horizontal component, as indicated by the dashed lines 84 and 86, respectively. The vertical component is in a downward direction, and the horizontal component is directed to the left, i.e., in a direction opposite the horizontal component for the first printer bar structure 10*a*.

Because the horizontal components of force and movement of the two adjacent printer bar structures 10*a* and 10*b* are in opposite directions, it is virtually impossible for one of the printer bar structures to move the other printer bar structure through frictional contact. More specifically, the paths of motion 70 for the printer bar structure 10*a*, and the frictional forces which may be applied by structure 10*a* to structure 10*b*, are parallel to the center lines through the solenoid arm 24*b* and link arms 44*b* of the adjacent printer bar structure 10*b*. Therefore, the sum of these frictional forces cannot produce a net torque which would tend to move printer bar structure 10*b* about its pivot points. The result of this arrangement of the solenoid arms and link arms is that an inactive printer bar cannot be moved into printing position to effect improper printing, and cannot be moved from its normal rest position to adversely effect print density or time of printing.

Another type of printer bar system embodying the invention is illustrated in FIGURE 4. As in the FIGURE 1 system, the sheaf 14 of documents and carbons rests upon the top surface of a platen 50, which platen may have an anvil pin arrangement (not shown) similar to that of the FIGURE 1 system. The printer bar structures are stacked one behind the other above the channel in the top surface of the platen 50. Consider the forwardmost structure by way of example. This structure 100*a* comprises first and second horizontal, elongated members 102*a*, 104*a*, the lower member 104*a* being a print bar. A plurality of struts 106*a* are spaced along the lengths of the horizontal members and hold these members in spaced relation. The struts 106*a* are inclined at the angle of close to 45° relative to the print bar.

The struts for all of the other odd numbered, i.e., alternate, printer bar structures also are inclined at an angle close to 45° relative to their printer bars, i.e., parallel to the struts 106*a*. Each of the printer bars for these odd numbered structures are connected to separate actuating mechanisms, such as the mechanism 110, illustrated in block form. By way of example, each actuating mechanism may be a solenoid having a generally horizontally movable plunger connected at the end of its associated printer bar.

The second printer bar structure 100*b* has its upper horizontal member positioned behind and in line with the member 102*a*. The lower member 104*b* is connected at its left end to an actuating mechanism 112. The same is true for all of the other even numbered printer bar structures. The printer bar 104*b* and its associated upper horizontal member are separated from one another and supported in spaced relation by a plurality of struts 106*b*. These struts are inclined at an angle of approximately 135° relative to the printer bar, and thus are substantially normal to the struts 106*a* of the adjacent printer bar structure. The same arrangement is employed for all of the even numbered printer bar structures.

All of the upper horizontal members, e.g., member 102*a*, are clamped together in a fixed position, as by means of bolts 112 which extend through the members and may extend also through a fixed frame (not shown). Thus, the upper horizontal member for each of the printer bar structures is held in a fixed position. The upper and lower horizontal members of a printer bar structure and the associated struts form parallelograms. The struts, e.g., **106*a*, 106*b*,** are very thin, and are made of flexible, resilient material, such as nickel steel.

When a solenoid or other actuating mechanism 110 is operated, a generally horizontal force is applied to the associated printer bar. This force is transmitted to the struts for that printer bar structure and these struts then flex at their points of interconnection with the printer bar and with the upper horizontal clamping member. The struts and printer bar move as parts of a parallelogram linkage, in a manner generally similar to that of the FIGURE 1 system. Because the struts of adjacent ones of the printer bar structures are substantially normal to one another, an actuated printer bar cannot move or drive an adjacent, inactive printer bar, for reasons previously described in connection with the arrangement of FIGURE 1.

Figure 5:
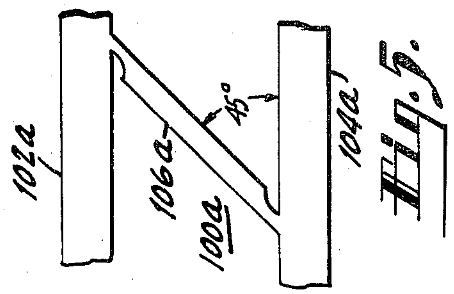
FIGURE 5 is an enlarged view in front elevation of a portion of one of the printer members of FIGURE 4.

A portion of printer bar structure **10*a* is illustrated in enlarged view in FIGURE 5. The horizontal members 102*a*, 104*a* and strut 106*a* may be integral with each other and formed from the same sheet of material, for example, by stamping. The portions of the strut 106*a* at the junctions with the horizontal members 102*a*, 104*a* are necked inwardly, i.e., reduced in width. Thus, strut 106*a* (and all other struts shown in FIGURE 4) is relatively wide for most of its length to provide a relatively stiff column capable of transmitting compression forces without buckling, but is relatively narrow at each end to form a flexural pivot at each end. The deflection of the metal at each end of strut 106*a*** produces the equivalent of a compression link with pivots at the ends.

As in the case of the FIGURE 1 system, the struts can be made slightly greater in thickness than the horizontal printer bars, e.g., **104*a*,** whereby the only points of frictional contact between adjacent structures are the small areas of contact between the struts of the adjacent structures.

What is claimed is:

1. The combination comprising:

a plurality of printer members stacked side-by-side and each having a printing edge;

at least two arms supporting each printer member; the centerlines of all the arms for each individual printer member being parallel to one another and inclined with respect to the printing edge of that member; and the centerlines of the parallel supporting arms of each individual printer member being normal to the centerlines of the supporting arms of adjacent printer members whereby the movement of any supporting arm moves its associated printer member in a direction which is substantially normal to the direction of movement induced by an associated supporting arm to an adjacent printer member.

2. The combination as claimed in claim 1, wherein the supporting arms of a printer member all have the same effective length.

3. The combination as claimed in claim 2, wherein the two said supporting arms of a printer member are two opposite arms of a parallelogram linkage.

4. The combination as claimed in claim 1, wherein the supporting arms for alternate ones of the printer members are inclined at an angle close to 45° relative to the printing edges of the associated printer members, and wherein the supporting arms for the remaining printer members are inclined at an angle close to 135° relative to the printing edges of the associated printer members.

5. The combination as claimed in claim 1, wherein each of the supporting arms of a printer member is supported on a different rod for rotation, each of the supporting arms of a printer member is pivotally pinned to that printer member, and the distance between the axis of each said rod and the axis of the pivot pin for the associated arm is the same for all supporting arms of the same printer member.

6. The combination as claimed in claim 5, wherein said printer members have elongated printing edges and are disposed on one side of a document printing zone, and including; an anvil disposed opposite the printing edges of said printing members on the other side of said printing zone; means for moving said anvil in a direction from one end of the elongated printing edges to the other end; and means for selectively rotating the supporting arms of a printer member in an angular direction to drive the printer member toward said anvil.

7. The combination as claimed in claim 1, wherein each printer member comprises an elongated printer bar, and including: fixed supporting means, the supporting arms for each printer member each being joined at one end to the printer bar and each being joined at the other end to said fixed supporting means.

8. The combination as claimed in claim 7, wherein the supporting arms are integral with the respective printer bars and with said supporting means, and are thin enough to flex when a longitudinal force is applied to the associated printer bar.

9. The combination as claimed in claim 7, including means for applying to any bar, selectively, a force having a component parallel to the printing edge thereof.

10. The combination as claimed in claim 9, wherein the printer bars are disposed on one side of a printing zone, and including: an anvil disposed opposite the printing edges of the printer bars on the other side of the printing zone, and means for moving said anvil at constant speed in a direction parallel to said printing edges from one end of the printer bars to the other end.

References Cited

UNITED STATES PATENTS

| | | | |
|---|---|---|---|
| 2,656,240 | 10/1953 | Hell | 101—93 |
| 2,659,652 | 11/1952 | Thompson | 101—93 |
| 3,144,821 | 8/1964 | Drejza | 101—93 |
| 3,155,032 | 11/1964 | Antonucci | 101—45 |
| 3,267,845 | 8/1966 | Simshauser | 101—93 |
| 3,317,017 | 5/1967 | Young | 197—1 |

ROBERT E. PULFREY, *Primary Examiner.*

E. S. BURR, *Assistant Examiner.*